United States Patent [19]

Stelman

[11] Patent Number: 4,880,608
[45] Date of Patent: Nov. 14, 1989

[54] CONTACTOR/FILTER IMPROVEMENTS

[75] Inventor: David Stelman, West Hills, Calif.

[73] Assignee: The United State of America as represented by the United States Department of Energy, Washington, D.C.

[21] Appl. No.: 213,798

[22] Filed: Jun. 30, 1988

[51] Int. Cl.[4] .............................................. B01J 8/00
[52] U.S. Cl. .................................... 423/244; 422/216; 55/99; 55/479
[58] Field of Search ................. 55/79, 96, 98, 99, 302, 55/390, 474, 479, 512; 423/244 R; 422/177, 216

[56] References Cited

U.S. PATENT DOCUMENTS

| | | | |
|---|---|---|---|
| 2,825,424 | 3/1958 | Gross | 55/316 |
| 3,912,466 | 10/1975 | Zenz | 55/98 |
| 4,006,533 | 2/1977 | Squires | 55/98 |
| 4,360,364 | 11/1982 | Kohl | 55/96 |
| 4,443,419 | 4/1984 | Carson | 423/244 |

OTHER PUBLICATIONS

A1-DOE-13562, Final Report Under Contract DE-AC22-83PC60262, pp. Title, Abstract, 12-14, 61 and 67-90.
Stelman, "Simultaneous Removal of $SO_x$, $NO_x$ and Particulates by a Moving Bed of Copper Oxide", Coal Utilization and Environmental Control, Contractors' Review Meeting, Jul. 7-9, 1987.

Primary Examiner—Bernard Nozick
Attorney, Agent, or Firm—Hugh G. Glenn; Robert J. Fisher; Judson R. Hightower

[57] ABSTRACT

A contactor/filter arrangement for removing particulate contaminants from a gaseous stream includes a housing having a substantially vertically oriented granular material retention member with upstream and downstream faces, a substantially vertically oriented microporous gas filter element, wherein the retention member and the filter element are spaced apart to provide a zone for the passage of granular material therethrough. The housing further includes a gas inlet means, a gas outlet means, and means for moving a body of granular material through the zone. A gaseous stream containing particulate contaminants passes through the gas inlet means as well as through the upstream face of the granular material retention member, passing through the retention member, the body of granular material, the microporous gas filter element, exiting out of the gas outlet means. Disposed on the upstream face of the filter element is a cover screen which isolates the filter element from contact with the moving granular bed and collects a portion of the particulates so as to form a dust cake having openings small enough to exclude the granular material, yet large enough to receive the dust particles. In one embodiment, the granular material is comprised of prous alumina impregnated with CuO, with the cover screen cleaned by the action of the moving granular material as well as by backflow pressure pulses.

23 Claims, 4 Drawing Sheets

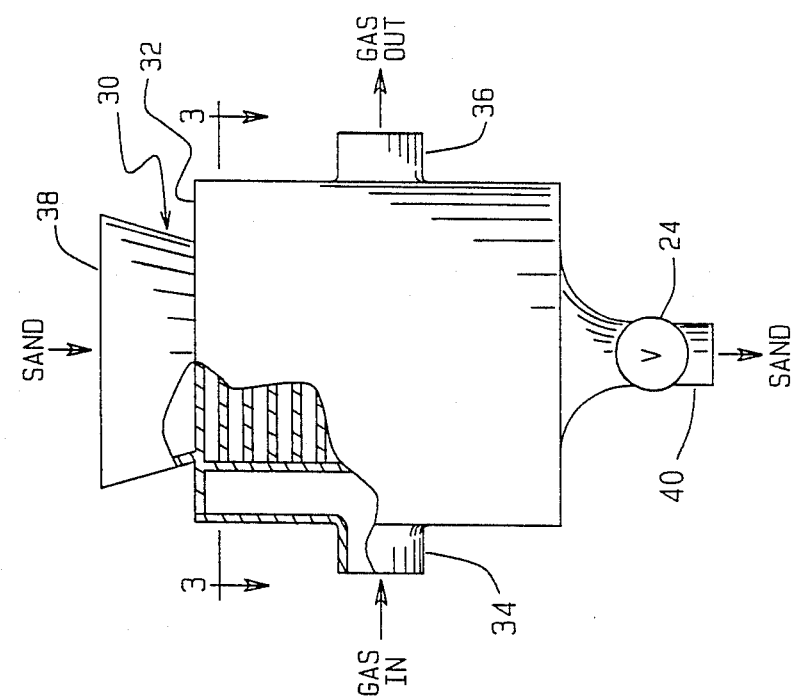
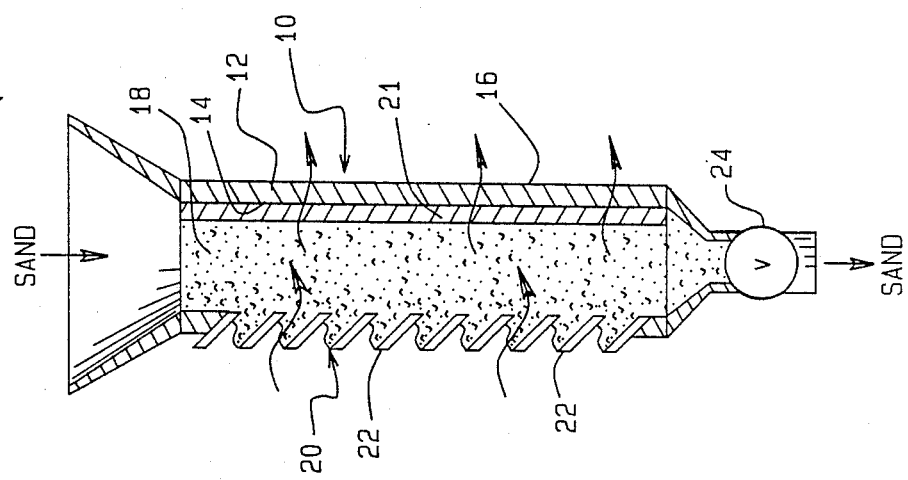
FIG. 1
FIG. 2

CONTACTOR/FILTER IMPROVEMENTS

CONTRACTUAL ORIGIN OF THE INVENTION

The U.S. government has rights in this invention pursuant to Contract No. DE-AC33-83PC60262 between the U.S. Department of Energy and Rockwell International.

BACKGROUND OF THE INVENTION

This invention relates generally to the elimination of polluting constituents from gaseous streams and is particularly directed to the removal of solid particulates from a high temperature gas.

The prior art discloses various approaches for treating waste gases to separate, for example, fly ash from flue gases. The terms fly ash, particulates, particles, and dust are used herein interchangeably. These approaches typically make use of gas filters, dynamic air-solids separators, wet scrubbers and electrostatic precipitators. All of these prior approaches suffer from various limitations and few of them are capable of effective removal of gas phase impurities from gaseous streams.

Bag filters or fiber fabric filters which have proved effective in removing solid contaminants from gaseous streams tend to become clogged with the gas entrained particles resulting in an excessive pressure drop across the filter, necessitating the use of some means to clean the surface of the filters. One approach for cleaning filters of this type involves the use of short pulses of pressure in a direction reverse to the normal gas flow to dislodge the particles entrapped by the filter. Another technique utilized to remove gas entrained particles involves the passing of contaminated gas through a bed of granular material such as sand. The gas entrained particles are collected on the upstream surface of and within the sand bed. Fixed beds suffer from the same disadvantage as the fiber or porous type filters discussed above, i.e., gas flow must be stopped for cleaning. Fluidized beds are continuous in operation but are less effective in removing small particles than a fixed or dense packed moving bed. In addition, sudden surges of gas passing through the fluidized bed can result in not only the previously contained particles passing through the bed, but also a portion of the bed itself being entrained in the gas, thus adding even more to the particulate loading of the gas stream.

The moving bed of granular material serves not only to remove particulates from the gas stream, but also removes gas entrained particulates from the filter through which the gas is directed. It is in this manner that prior art filter approaches have attempted to maintain the filter in a clean condition and free from clogging particulates. Unfortunately, contact of the moving bed of granular material with the filter causes excessive wear of the filter, particularly for the more common woven cloth filters. Hence, filtering arrangements which make use of a moving bed of granular material require frequent replacement of the filter element.

Over the past twenty-five years, attempts to reduce air pollution led to the use of copper oxide for removing $SO_X$ from flue gas or copper oxide in combination with ammonia for simultaneous removal of $NO_X$ and $SO_X$ from flue gas. Copper oxide reacts with $SO_X$ forming $CuSO_4$. The $NO_X$ is catalytically reduced with ammonia, forming nitrogen and water. The absorber-catalyst is regenerated by reacting the copper sulfate thus formed with a reducing gas such as hydrogen, methane, or synthesis gas, and is then reused in the process. The regeneration step produces a side stream of concentrated $SO_2$, which can be converted to liquid $SO_2$, elemental sulfur, or sulfuric acid by known processes. The optimum temperature for the $SO_X$ reaction, the $NO_X$ reduction, and the catalyst regeneration all occur at approximately 400° C. The process is regenerative, dry, and produces no waste materials.

Several different types of contactors have been proposed for copper oxide processes. To avoid the plugging of fixed beds by soot and fly ash particles, an "Open Channel" reactor has been developed, in which the flue gas is passed alongside large surfaces of absorbent mass rather than through a particle bed. With this parallel passage design, soot and fly ash pass through the channels without plugging the absorbent bed. The choice of the open channel reactor results in a cyclic process. This process uses two reactors. While one is absorbing $SO_2$, the other is regenerated. The cyclic flow rates in the regenerator are dampened with gas holders and an absorber-stripper. This process is known as the Shell/Union Oil Products (UOP) process.

Another approach being developed employs a fluidized-bed copper oxide process for coal-fired combustion sources wherein the fly ash passes through the fluidized bed without plugging it. This process has the advantage that it is continuous and offers intimate contact between the gas and the catalyst. However, this approach as well as the Shell/UOP "Open Channel" reactor discussed above requires a separate downstream particle collector to control the fly ash on coal-fired power plants.

The present invention overcomes the aforementioned limitations of the prior art by providing a single-stage, continuous process for simultaneously removing 90% of the $NO_X$, 90% of the $SO_X$, and 99.9 of the particulate material from flue gas from coal-fired combustion sources. Apparatus in accordance with the present invention utilizes a novel contactor/filter with a moving-bed of granular copper oxide absorber-catalyst which is retained between louvers or a screen on the gas inlet side and a sheet of filter material on the exit side. A cover screen is disposed between the upstream side of the sheet of filter material and the moving-bed of copper oxide absorber-catalyst.

OBJECTS AND SUMMARY OF THE INVENTION

Accordingly, it is an object of the present invention to provide an improved contactor/filter arrangement for removing noxious gases and particulate pollutants from flue gas from coal-gas fired combustion sources.

It is another object of the present invention to provide an apparatus and method for the simultaneous removal of substantially all $NO_X$ and $SO_X$ together with particulates from combustion flue gases.

Yet another object of the present invention is to increase the useful lifetime of the contactor/filter element in a flowing granular material filter cleaning arrangement.

A further object of the present invention is to provide for the filtering out of particulates from flue gases using a layer of the particulates collected on the upstream side of a porous filter element, with the dust collected particles periodically removed from in front of the filter element.

A still further object of the present invention is to provide apparatus and method for filtering out $SO_X$ and $NO_X$ as well as particulates from combustion flue gas using an activated flowing bed of granular material.

Yet another object of the present invention is to increase the filtering action of a flowing bed of granular material in a contactor/filter arrangement by impregnating the granules with CuO.

Another object of the present invention is to substantially eliminate wear on the porous filter element of a flowing granular bed filter arrangement.

This invention contemplates apparatus and method for removing fine particulates from a gas stream comprising: passing a fine particulate-containing gas stream through a body of granular material to a substantially gas-permeable microporous filter element; isolating the body of granular material from an upstream surface of said microporous filter element with a particulate entrapment structure; collecting the particulates in the entrapment structure in forming a layer of particulates on an upstream face of the entrapment structure; scouring the upstream face of the entrapment structure to remove the particulates therefrom by moving the body of granular material across the upstream face of the entrapment structure, thereby maintaining the gas stream pressure drop across the body of granular material, the entrapment structure and the microporous filter element within a desired range while concurrently removing particulate contaminants from the gas stream; and withdrawing a substantially particulate-free gas stream from the downstream face of the microporous filter element.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an elevation view in cross section of a contactor/filter arrangement in accordance with the present invention;

Figure 3:
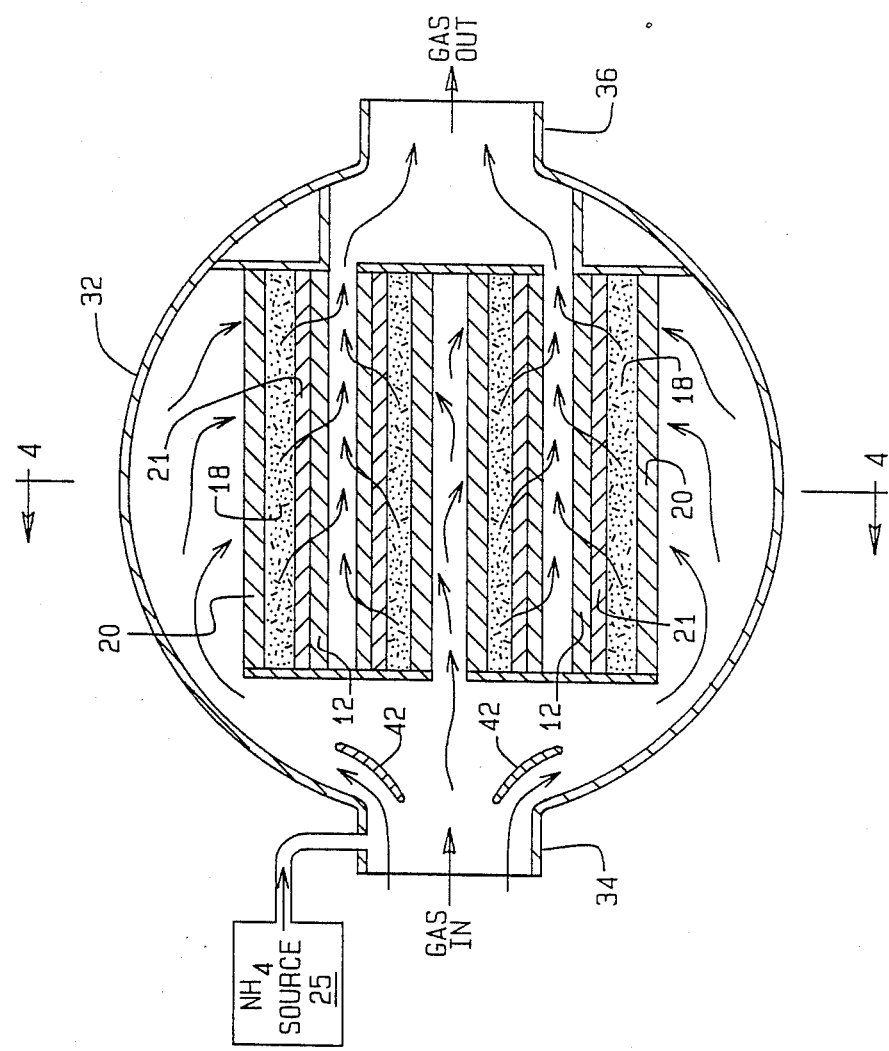
Figure 4:
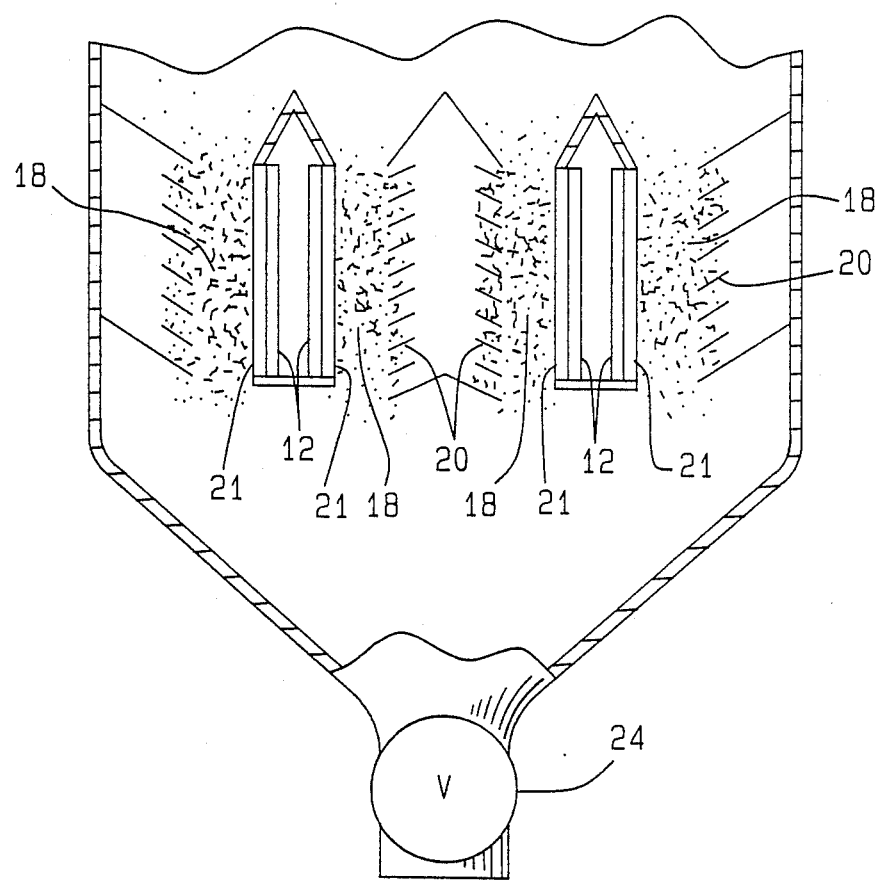
Figures 5, 6:
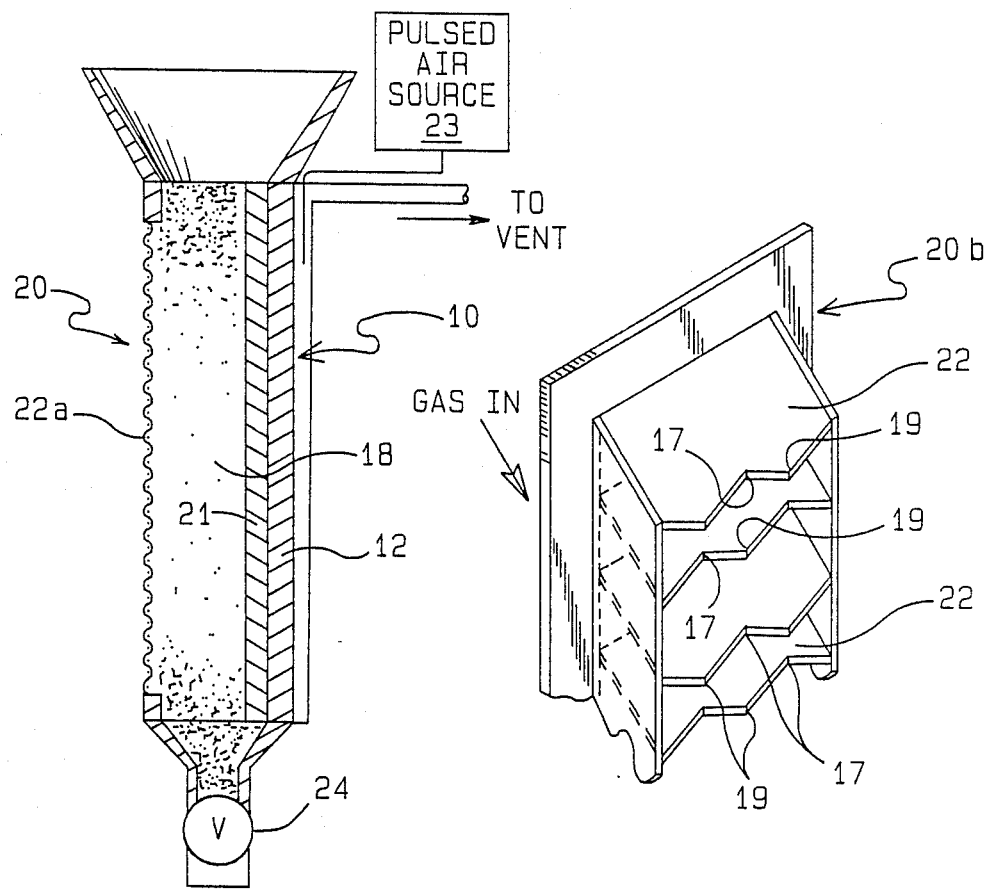

FIG . 2 is an elevation view of a preferred contactor/filter arrangement in accordance with the present invention which comprises a plurality of individual filter panel assemblies;

FIG. 3 is a top view of FIG. 2 taken along plane 3—3 therein;

FIG. 4 is a side view of FIG. 3 taken along plane 4—4 therein;

FIG. 5 is a vertical section of a contactor/filter arrangement of the present invention showing an alternate configuration for the granular material retention member; and FIG. 6 is a pictorial view of a portion of the contactor/filter arrangement of the present invention showing yet another configuration of the granular material retention member.

DETAILED DESCRIPTION OF THE PREFERRED EMBODIMENT

In the several figures like reference numbers refer to like parts having like functions. In FIG. 1 a contactor/filter arrangement of the present invention is generally designated by the reference numeral 10. The contactor/filter arrangement 10 comprises a gas-permeable filter element 12 having an upstream face 14 and a downstream face 16, and formed from an appropriate filter material for the removal of particulates within a desired size range. Typically, the gas-permeable filter element 12 will be formed from fibers either woven in a dense cloth or randomly oriented fibers which have been compressed and/or sintered to form a felt or placque. Dutch twill is one example of such a filter structure.

The selection of fiber materials is not particularly critical provided, of course, that it is not attacked by the contaminants contained in the gas stream to be processed and is capable of withstanding the anticipated operating temperatures. Thus, for low temperature gases, conventional fabric filter material may be used such as cotton, wool and the various synthetic fibers. It is a particular advantage of the present invention, however, that the more brittle ceramic filter materials also may be used as well as porous metal filters.

When the temperature is in excess of about 500° F., the ceramic or metal filter materials are required. Numerous filter materials are commercially available for the removal of particulates from a gaseous stream and the selection of a specific material or filter element to be utilized is well within the skill of one versed in the art. Generally, such materials provide a plurality of tortuous flow paths for the passage of gas therethrough and the retention of entrained particulates on the upstream surface.

Disposed in contact with the upstream wall 14 of the gas permeable filter element 12 along the length thereof is a cover screen 21 in accordance with the present invention. The cover screen 21 isolates flowing granular material 18 from the upstream wall 14 of the filter element 12. The granular material may be sand or other inert material if the sole desire is to filter particulate matter from the gas stream. It will be appreciated, however, that the granular material also could be an active material or contain an active material for removal of acid or other reactive impurity constituents of the gas stream. For example, if the gaseous stream contains $SO_2$, the granular material could be solid granules of an alkali metal bicarbonate or could be sand mixed with an alkali metal bicarbonate for the absorption and removal of the sulfur constituent. If the gas stream contains $H_2S$, the granular material could be iron oxide, zinc oxide, or other metal oxide which is reactive with $H_2S$. If the gas stream contains reactive "fume" particles such as $AlCl_3$ in sizes below 0.1 micron, the granular material could be activated alumina; and if the gas stream contains trace hydrocarbon vapors such as benzene, the granular material could be activated carbon. Numerous other equivalent active materials will be readily apparent to those versed in the art.

The granular material 18 is maintained in position by a substantially vertical granular material retaining member designated generally as 20 and depicted as a plurality of louvers 22. The louvers 22 are shown as solid members, however, it will be readily apparent to those versed in the art that they also could be formed from a screen or other perforated body provided the openings or size of the perforations are smaller than the size of the granular material selected. The granular material retaining member 20 and cover screen 21 provide a granular material passageway for confining the body of granular particulate material 18. Preferably, the granular material 18 is introduced into the passageway through the top of contactor/filter arrangement 10 such that it is fillable by gravity, the rate of flow being regulated by a valve 24 located adjacent to the bottom of contactor/filter arrangement 10. The rate at which the granular material is moved through the passageway is not particularly critical, provided, of course, i& is sufficient to provide some scouring action. A high rate of movement results in an unnecessary expenditure of energy. Generally, very good result are obtained when the body of granular material is moved across the upstream face of the cover screen 21 at a velocity within the rang of from about 0.1 to 10 feet per minute.

The thickness or depth of the body of granular material 18 is determined, of course, by the spacing between member 20 and cover screen 21. The dimension is not particularly critical provided it is sufficiently deep to allow for the uniform flow of granular material through the passageway, i.e., at least about 10 times the diameter of the particles of granular materials. The maximum thickness is, of course, limited by the amount of pressure drop which can be tolerated across the contactor/filter arrangement 10 and the economics of the system. Specifically, the thicker the body, the higher the pressure drop, which results in a corresponding increase in pumping requirements and cost. Generally, the pressure drop across the panel should be less than about 10% of the inlet pressure of the gas stream to be filtered and preferably less than about 5%. It is a particular advantage of the present invention that it is possible to assemble the contactor/filter arrangement 10 through which the pressure drop is less than 2% of the inlet pressure of the gas to be filtered and to maintain that pressure drop substantially constant independent of the particulate loading of the gas being treated. Generally, the depth of the granular material 18 will be within a range of from about 1 inch to 18 inches, with particularly good results being obtained with a depth of from about 2 to 10 inches.

The granular material 18 is selected to have a median grain or particle size in excess of that which would collect a major portion of the particulate contaminants as a "cake" on the upstream surface of the body of granular material. Thus, by selecting granular material with a larger median grain size, the major portion of the particulate contaminants pass through the upstream surface of the body of granular material, and are collected in the body of granular material and upon the cover screen 21. Generally, it is preferred that the granular material 18 have a median grain size of at least 20 times that of the median size of the particles to be collected. For example, when the gas stream to be treated is a flue gas having particles within the range of from about 1 to 10 microns, a body of granular material having a median grain size larger than 100 microns is preferred. Particularly good results are obtained when the granular material has a median grain size within the range of from about 0.2 to 5 mm.

It also is contemplated within the scope of the present invention to treat the granular material for reuse. Specifically the granular material withdrawn from the apparatus after scouring the face of the cover screen 21 is readily treatable to remove the particulate contaminants contained therein, for example, by sieving, elutriation, washing or the like. When the granular material includes an active material which has reacted with gas phase impurities, the reacted materials also are readily removed by conventional techniques and disposed of or regenerated for reuse.

Referring now to FIGS. 2, 3 and 4, therein is depicted a contactor/filter assembly 30 of the present invention that comprises a housing 32 containing a plurality of pairs of substantially vertical granular material retaining members 20 and pairs of gas-permeable cover screens 21 arranged in an alternate array to form a plurality of passageways for the body of granular material 18. Housing 32 is provided with a gas inlet means 34 and a gas outlet means 36. It also is provided with a means for passing a body of granular particulate material 18 through the passageways, such as a granular material inlet 38 and outlet 40, the flow of granular material through the housing and passageways being regulated, for example, by hopper valve 24. Optionally, contactor/filter assembly 30 also may include within housing 32 a plurality of baffles 42 to ensure that each of the filter elements 12 receives an equivalent amount of the gas to be filtered.

FIG. 5 depicts an alternate embodiment of the contactor/filter arrangement 10 wherein granular material retaining member 20 comprises a screen 22a. FIG. 6 is a pictorial sketch of a particularly preferred granular material retention member 20b wherein the individual louvers or slats 22 are provided with an irregular downstream edge. In the embodiment depicted, slats 22 are provided with a sawtooth configuration wherein each downstream point 19 is in vertical alignment with a downstream slot or vee 17 of the adjacent slats 22. Such a configuration provides an increased surface area exposed to the particulate containing gas thereby reducing the possibility of a cake buildup on the downstream edges of slats 22. Also, the staggered arrangement of points 19 and vee's 17 provides an irregular flow path for the body of granular material 18 which further assists in the prevention of a cake buildup.

It will be appreciated that while in the preferred embodiments depicted, qas-permeable filter element 12 is shown in each instance as being substantially vertical, it also could be inclined to the horizontal and still utilize a gravity flow of the body of granular material 18. It also will be apparent to those versed in the art that sand could be introduced into a bottom portion of the apparatus and forced upwardly therethrough. However, this would unduly complicate the practice of the invention and therefore is not a preferred or desirable technique.

The present invention is particularly suitable for performing high efficiency cleanup of a gas which has passed through a fluidized bed. In fluidized bed combustion of coal, for example, it is desirable to perform the combustion under pressure, then expand the high temperature combustion gas through a gas turbine to extract power before passing it to a steam boiler. This arrangement results in a very high efficiency system for generating electric power. Unfortunately, fine particles of fluidized bed material or coal ash cause severe erosion of the expansion blades of the turbine, hence very high efficiency removal of fine particles is required. In the proposed application of the invention, material for the fluidized bed is used as the granular material in the filtration apparatus. Clean granular material intended for use in the fluidized bed is first fed to the top of the filtration apparatus and then drained from the bottom of this unit directly into the fluidized bed (together with collected fine particles). Spent fluidized bed material is removed as required for regeneration and removal of particulates or disposal as desired.

By placing a suitably sized cover screen 21 over the upstream face 14 of the gas-permeable filter element 12 a space is provided for a thin dust cake to form which the moving bed of granular particulate 18 cannot wipe off. The permanent thin dust cake disposed within the cover screen 21 becomes the particle filter. The cover screen 21 thus permits the dust cake to form not only on the surface of the screen but also below its surface where it is protected from the moving bed of granular material 18. The gas-permeable cover screen 21 also protects and isolates the filter element 21 from the moving bed of granular particulate material 18. This permits traditional filter elements typically comprised of cloth, paper, felt, or porous sheets to be used essentially indefinitely without wearing out in the contactor/filter arrangement 10 of the present invention. The cover screen 21 serves as a support on which the dust cake can form. The cover screen 21 for forming the dust cake is preferably provided with apertures small enough to exclude the particles of the moving bed granular material 18, yet large enough to pass the expected dust particles, e.g., 1–10 microns. The porosity of the filter element 12, however, is such that its apertures are small enough to exclude the dust particles which because of the cover sheet 21 and dust cake disposed thereon do not, for the most part, reach the filter element. In verifying the present invention, custom-fabricated Dynapore laminated metal filter elements provided by Michigan Dynamics, of Garden City, Mich., consisting of a 40 mesh metal screen, a Dutch twill filter cloth, and a 1.2 millimeter thick hexagonal perforated support plate were used. The three layers were diffusion-bonded together into a single flat structure fabricated from 300 series stainless steel and rated for service up to 650° C. Three pore sizes of 20, 45, and 65 microns were used.

The thickness of the dust cake formed on the cover screen 21 is limited by its contact with the flowing body of granular material 18. The flowing body of granular material 18 continuously cleans the upstream surface of the cover screen 21 and prevents it from becoming clogged by trapped particulates. In a preferred embodiment, the dust cake is removed from the cover screen 21 not only by the moving particulate bed, but also by directing a pulse of gas upstream through the combination of the filter element 12 and cover screen 21. These pulses may be provided by any conventional means such as a pulsed air source 23 as shown in FIG. 5.

Also in accordance with a preferred embodiment of the present invention, the granular particulate material 18 is comprised of copper oxide (CuO) pellets. The granular bed material may be prepared by impregnating porous alumina particles with copper nitrate solution, drying and calcining to form copper oxide impregnated in the porous alumina. The particles preferably are 0.2 to 5 millimeters in diameter, or of a size too large to be received by the dust cake within the cover screen 21. The copper oxide reacts with $SO_X$ forming $CuSO_4$. A source of ammonia 25 is preferably disposed upstream from the contactor/filter arrangement of the present invention as shown in FIG. 3 in order to introduce ammonia into the flue gas. $NO_X$ is catalytically reduced with ammonia, forming nitrogen and water. The absorber-catalyst is regenerated by reacting the copper sulfate thus formed with a reducing agent such as hydrogen, methane, or synthesis gas, and is then reused in the process. The regeneration step produces a side stream of concentrated $SO_2$, which can be converted to liquid $SO_2$, elemental sulfur or sulfuric acid by known processes. The optimum temperature for the $SO_X$ reaction, the $NO_X$ reduction, and the catalyst regeneration all occur at about 400° C. The process is regenerative, dry, and produces no waste materials.

There has thus been shown an improved apparatus and method for filtering combustion generated flue gases which provides:

Continuous, noncyclic gas/solids contact and removal;

Efficient mass transfer by permitting gas to flow through a bed of small particles, resulting in high catalyst utilization and a low Cu/S ratio;

Low pressure drop due to the use of a thin bed;

Freedom from plugging of the catalyst bed by fly ash in the flue gas;

Longer lifetime for the filter element by isolating it from the moving granular bed;

Use of the trapped granular particulates themselves as th filter element, the thickness of which can be easily controlled to prevent clogging;

No entrainment of bed material into the cleaned flue gas;

Complete (greater than 99.9%) removal of fly ash simultaneously with $SO_X$ and $NO_X$; and Smooth and continuous requirement for reducing gas and production of $SO_2$.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A filter apparatus for removing fine particulates from a gas stream, wherein said particulates range in size from approximately 1 to 10 microns, said filter apparatus comprising:

a housing containing a substantially gas-permeable microporous filter element having restricted flow paths therethrough and an upstream face relative to a gas stream passing through the apparatus;

a substantially vertical granular material retention member having upstream and downstream faces and provided with openings for the substantially unimpeded flow of a fine particulate-containing gas stream therethrough, said retention member being located in said housing and having its downstream face spaced apart from the upstream face of said microporous filter element to provide a passageway therebetween;

a body of granular material of a median particle size of about 0.2 to 5 millimeters in diameter disposed in said passageway and permeable to the flow of the fine particulate-containing gas stream therethrough;

gas inlet means for the delivery of the fine particulate-containing gas stream to the upstream face of said retention member for passage through said retention member and body of granular material to the upstream face of said microporous filter element;

a cover means defining an upstream face and having a plurality of apertures formed therein, disposed over the upstream face of said microporous filter element and adapted to pass the gas stream and entrap and remove particulates from the gas stream wherein the thus entrapped particulates form a dust cake which is disposed within said apertures and on the upstream surface of said cover screen and which cake is impervious to the particulates for collection of particulates from the gas stream, wherein the apertures in said cover means range in size from approximately 1 to 10 microns;

means for scouring the upstream face of said cover means with the granular material by at least intermittent movement of said body of granular material adjacent said upstream face of said cover means to remove collected fine particulates therefrom; and gas outlet means for the removal of a substantially particulate-free gas stream from a downstream face of said microporous filter element, said retention member, body of granular material, cover means and microporous filter element providing the sole means for gas communication between said gas inlet and gas outlet means.

2. The apparatus of claim 1 wherein the granular material has a median particle size at least twenty times that of the fine particulates to be removed.

3. The apparatus of claim 1 wherein said microporous filter element is formed from fibers having a diameter within the range of from about 2 to 30 microns.

4. The apparatus of claim 1 wherein said means for scouring provides for continuous movement of said body of granular material.

5. The apparatus of claim 1 wherein said microporous filter element is formed from ceramic fibers.

6. The apparatus of claim 1 wherein there is provided a plurality of retention members, cover means and microporous filter elements.

7. The apparatus of claim 1 wherein said cover means comprises a metal screen.

8. The apparatus of claim 1 wherein the gas stream contains gas-phase contaminants and said granular material includes an active material to react with said gas-phase contaminants.

9. The apparatus of claim 8 wherein said active material is copper oxide (CuO).

10. A contactor/filter arrangement for removing fine particulates from a gas stream, wherein said particulates range in size from approximately 1 to 10 microns, said arrangement comprising:
a housing having a gas inlet aperture and a gas outlet aperture through which the gas stream is directed;
a gas permeable microporous filter element disposed within said housing and intermediate said gas inlet and outlet apertures and having upstream and downstream faces relative to the gas stream, said filter element comprised of a material having low abrasion resistance;
an abrasion resistant, cover means defining an upstream face and having a plurality of apertures formed therein, disposed over the upstream face of said filter element, said cover means being adapted for supporting a dust cake formed thereon from said fine particulates which dust cake is disposed in said apertures and on said upstream face of said cover means, wherein the apertures in said cover means range in size from approximately 1 to 10 microns;
means for directing granular material of a median particle size of about 0.2 to 5 millimeters in diameter through the particulate-bearing gas stream so as to contact and remove said dust cake from said upstream face of said cover means without removing said dust cake disposed in said apertures, thereby limiting the thickness of said dust cake.

11. The apparatus of claim 10 wherein said filter element is comprised of ceramic fiber paper, woven cloth, or felt and said cover means is comprised of steel mesh.

12. The apparatus of claim 10 further comprising means for directing gas pulses upstream through said filter element and said cover means for periodically removing a portion of the particulates entrapped therein.

13. The apparatus of claim 10 wherein said gas stream further contains gas contaminants and wherein said granular material includes a chemically activated material which reacts with the gas contaminants for removing the gas contaminants from the gas stream.

14. A method of removing fine particulates from a gas stream, wherein said particulates range in size from approximately 1 to 10 microns, said method comprising:
passing a fine particulate-containing gas stream through a body of granular material of a median particle size of about 0.2 to 5 millimeters in diameter to a substantially gas-permeable microporous filter element;
isolating the body of granular material from an upstream surface of said microporous filter element with a particulate entrapment structure;
collecting the particulates with said entrapment structure so as to form a dust cake, which dust cake is disposed on an upstream surface of said entrapment structure and within said entrapment structure, below said upstream surface, including the step of providing said particulate entrapment structure with a plurality of spaced apertures ranging in size from approximately 1 to 10 microns;
scouring the upstream face of said entrapment structure to remove the dust cake therefrom, without removing said dust cake disposed within said entrapment structure, below said upstream surface, by moving said body of granular material across the upstream face of said entrapment structure, thereby maintaining the gas stream pressure drop across the body of granular material, said entrapment structure and said microporous filter element within a desired range while concurrently removing particulate contaminants from the gas stream; and
withdrawing a substantially particulate-free gas stream from the downstream face of said microporous filter element.

15. The method of claim 14 wherein the granular material has a median particle size at least twenty times that of the fine particulates to be removed.

16. The method of claim 14 further comprising the step of forming said microporous filter element from fibers having a diameter within the range of from about 2 to 30 microns.

17. The method of claim 14 further comprising the step of moving said body of granular material continuously to provide a substantially constant desired gas stream pressure drop during operation.

18. The method of claim 14 further comprising the step of forming said microporous filter element from ceramic fibers and introducing the fine particulate-containing gas stream at a temperature in excess of about 500° F.

19. The method of claim 14 further comprising the step of moving said body of granular material across the upstream face of said entrapment structure at a velocity within the range of from about 0.1 to 10 feet per minute.

20. The method of claim 14 wherein the gas stream also contains gas-phase impurities and the granular material includes an active material to react with said gas-phase impurities.

21. The method of claim 14 wherein a fine particulate filter aid having a median particle size of from about 20 to 100 microns is incorporated into said body of granular material.

22. The method of claim 14 further comprising the step of collecting the granular material for reuse after scouring the upstream face of said entrapment structure.

23. The method of claim 14 wherein said fine particulate-containing gas stream is an effluent gas from a fluidized bed, said method further comprising the step of transferring the granular material to said fluidized bed after scouring the upstream face of said entrapment structure.

* * * * *